Dec. 2, 1924.
C. F. STREET
LOCOMOTIVE STARTER
Filed March 24, 1921
1,517,261
3 Sheets-Sheet 1
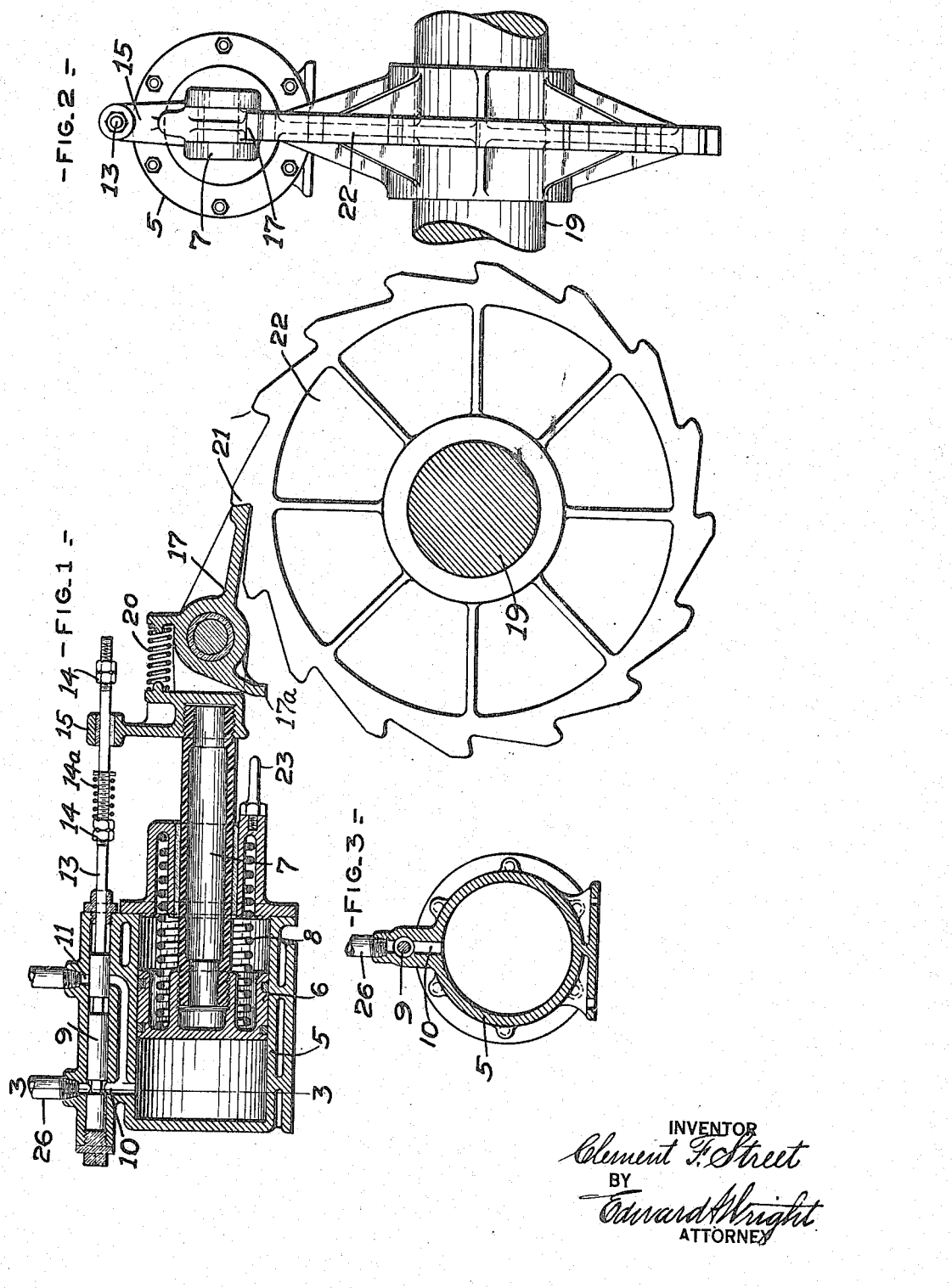
INVENTOR
Clement F. Street
BY
Edward A. Wright
ATTORNEY Dec. 2, 1924.
C. F. STREET
1,517,261
LOCOMOTIVE STARTER
Filed March 24, 1921   3 Sheets-Sheet 2
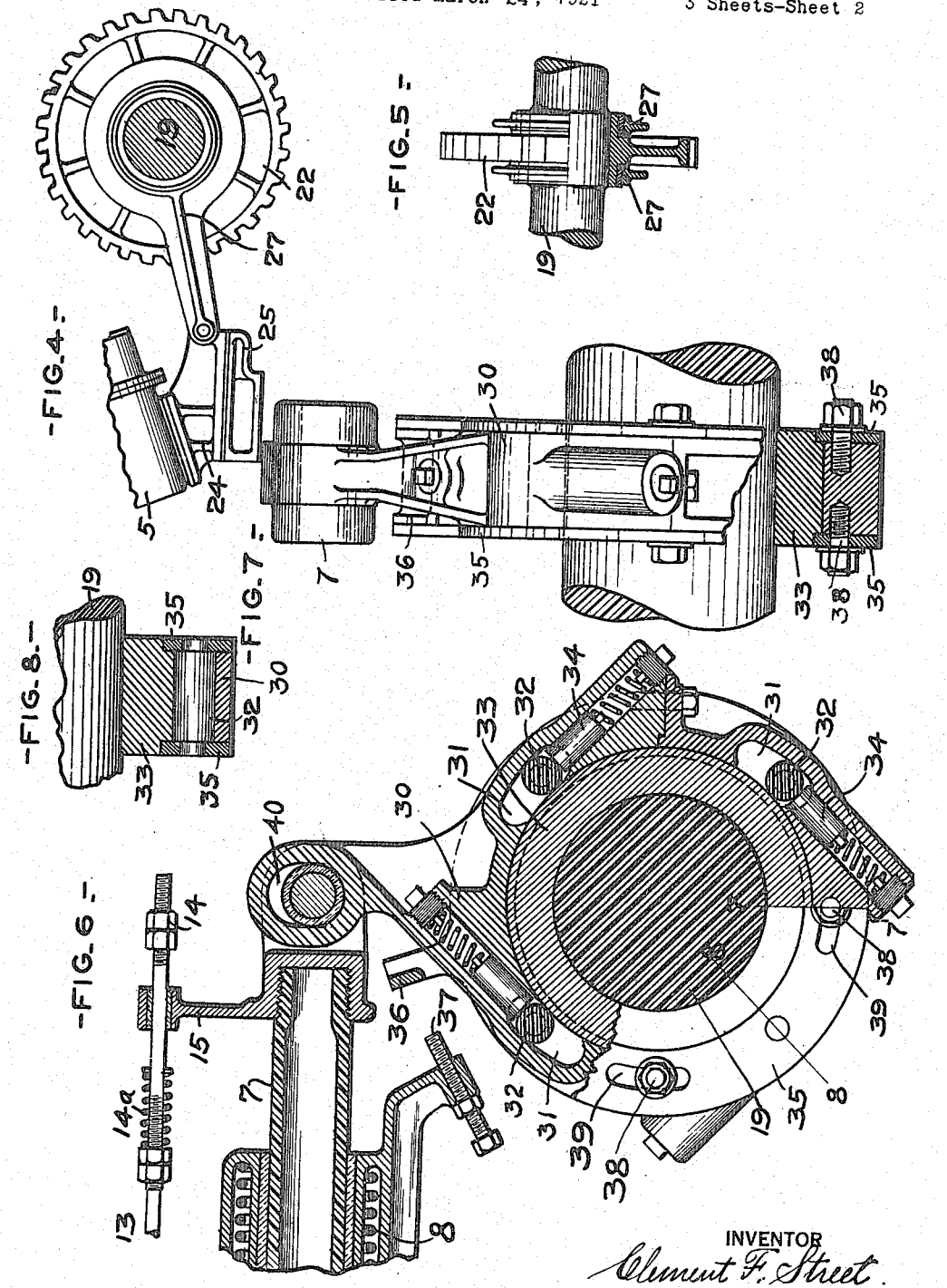
INVENTOR
Clement F. Street
BY
Edward A. Wright
ATTORNEY Dec. 2, 1924.  
C. F. STREET  
LOCOMOTIVE STARTER  
Filed March 24, 1921  
1,517,261  
3 Sheets-Sheet 3
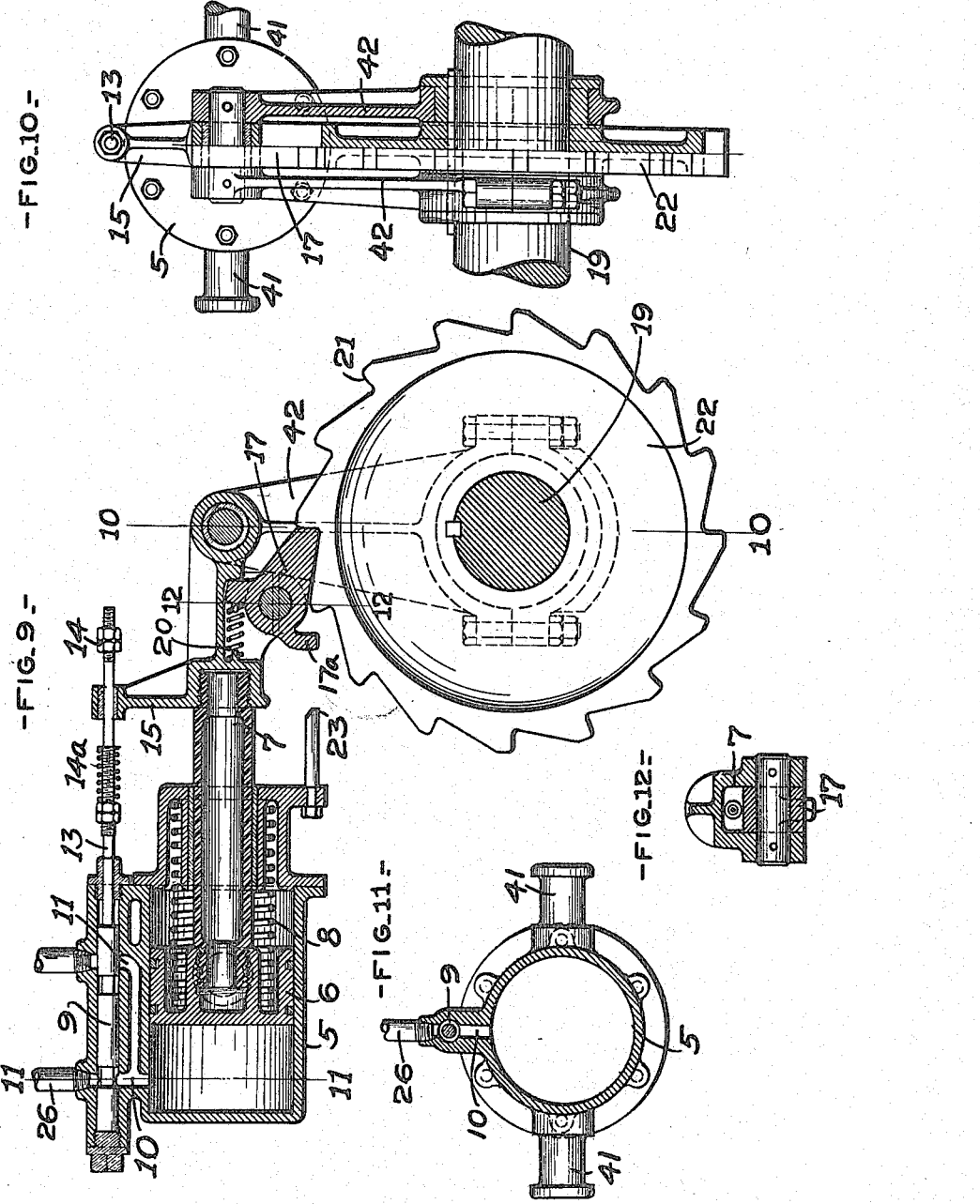
INVENTOR  
Clement F. Street  
BY  
Edward A. Wright  
ATTORNEY Patented Dec. 2, 1924.

1,517,261

UNITED STATES PATENT OFFICE.

CLEMENT F. STREET, OF GREENWICH, CONNECTICUT.

LOCOMOTIVE STARTER.

Application filed March 24, 1921. Serial No. 455,037.

*To all whom it may concern:*

Be it known that I, CLEMENT F. STREET, a citizen of the United States, residing at Greenwich, in the county of Fairfield and State of Connecticut, have invented a certain new and useful Improvement in Locomotive Starters, of which improvement the following is a specification.

This invention relates to locomotives, and has for its object to provide an improved starting device for increasing the capacity of the locomotive and making it possible to start heavier trains.

In my prior application, filed March 23, 1920, Serial No. 368,123, I have shown and described a locomotive starting device comprising an auxiliary motor having a ratchet connection for driving one of the wheels or axles of the locomotive, thereby exerting additional tractive effort for assisting in the starting of the locomotive and train. My present invention is in the nature of an improvement on the device of said prior application, and one of its features comprises a simplified construction of reciprocating motor and driving connection with the axle, whereby various parts are eliminated, and a direct and positive action is obtained. Another feature comprises an improved friction clutch mechanism for operating the axle. And still another feature comprises means connected to the axle for bracing the motor support against the thrust of the motor.

In the accompanying drawings: Figure 1 is a section of one form of motor and my improved direct connection with a pawl and ratchet mechanism mounted on an axle of the vehicle; Fig. 2, an end view of the same; Fig. 3, a transverse section of the motor cylinder taken on the line 3—3 of Fig. 1; Fig. 4, a side elevation showing means for supporting the motor and a thrust bar connection for tying the same to the axle; Fig. 5, a view, partly in elevation and partly in section, of the parts mounted on the axle in Fig. 4; Fig. 6, a section showing a modification comprising a locking and slipping clutch mechanism mounted on the axle and directly connected to the piston rod of the motor; Fig. 7, an end elevation of the clutch mechanism, partly in section, on the line 7—7 of Fig. 6; Fig. 8, a sectional view, taken on the line 8—8 of Fig. 6; Fig. 9, a sectional view, similar to Fig. 1, but showing another modification in which the motor cylinder is mounted to oscillate on trunnions; Fig. 10, an end view, of the same, partly in elevation and partly in section, on the line 10—10 of Fig. 9; Fig. 11, a transverse section of the motor cylinder, taken on the line 11—11 of Fig. 9; and Fig. 12, a transverse section of the pawl connection taken on the line 12—12 of Fig. 9.

According to the construction disclosed in my prior application above mentioned, the pawl for operating the ratchet wheel on the axle, is pivotally mounted on a sliding member which reciprocates within a fixed guide by the movement of the piston on the motor. According to my present improvement, the sliding member and guide are eliminated, and the pawl, or other member of a forward locking and backward slipping mechanism for rotating the axle, is directly connected to the piston rod of the motor.

As shown in Figs. 1, 2 and 3, of the drawings, the motor comprises a cylinder, 5, having a piston, 6, and rod, 7, provided with a pawl, 17, pivoted directly upon the outer end of the rod which has a long bearing in the end of the cylinder for supporting the rod and pawl.

The admission of steam or other fluid under pressure for actuating the piston is controlled by the valve, 9, from pipe, 26, through port, 10, the valve having a stem, 13, provided with tappets, 14, operated by the arm, 15, carried by the piston rod, 7. A spring, $14^a$, may also be mounted on the valve stem, 13, to permit the movement of the piston to its extreme inner position when the fluid supply is cut off. The exhaust escapes through port, 11, when the piston is returned by means of the spring, 8. The spring, 20, normally keeps the pawl 17, bearing upon the teeth, 21, of the ratchet wheel, 22, rigidly mounted on the axle, 19. In a locomotive, this may be the axle of the trailing wheels or of the pilot wheels, or an axle of the tender, or it may be applied to any axle of a vehicle.

When it is desired to operate the motor to assist in starting or driving the locomotive or other vehicle, fluid is admitted to pipe, 26, by the engineer, through any suitable manual control device, (not shown), and the piston moves outwardly against the spring, 8, and actuates the pawl, 17, to lock against a tooth, 21, of the wheel, 22, and turn the axle, 19. When the piston reaches the outer end of its traverse, the arm, 15, engages a tappet, 14, and shifts the valve, 9, to shut off the supply and open the exhaust port, 11, whereupon the spring, 8, returns the piston toward its inner position, during which movement the pawl slips backward over the teeth of the ratchet wheel. The valve is then shifted by the arm, 15, to close the exhaust and again open the supply port, whereupon the piston rod and pawl continue to reciprocate and operate to turn the shaft. When the supply of fluid to pipe, 26, is shut off by the engineer, the spring, 8, returns the piston to its extreme inner position against the head of the cylinder, in which position the projection, 17$^a$, of the pawl engages the stop, 23, and raises the pawl out of engagement with the ratchet teeth, so that the wheel, 22, may rotate freely with the axle and without touching the pawl.

The cylinder, 5, of the motor is preferably mounted on a base casting, 24, supported on a member, 25, of the truck frame, in proper position to operate the pawl and ratchet or other forward locking and backward slipping device for turning the axle, and for the purpose of relieving the frame from the thrust of the motor, a tie bar, 27, one or more, having one end mounted on the axle, or the hub of the ratchet wheel, 22, and the other end pivotally attached to the base, 24, may be employed, all as shown in Figs. 4 and 5 of the drawing. The reaction from the thrust of the motor is thus taken up by the tie bar thereby avoiding the tendency to bend the truck frame, and the tie bar adjusts itself to different relative positions of the frame and axle.

Other forms of a forward locking and backward slipping device may be employed in lieu of the pawl and ratchet mechanism, already described. For instance, in Figs. 6, 7 and 8, I show a reciprocating friction clutch device, 30, mounted to oscillate on the axle and directly connected to the end of the piston rod, 7, by means of a pin extending through an elongated opening 40, to provide for the oscillating movement. In this construction, the member, 30, extends around the axle and has a number of tapered pockets or recesses, 31, each containing a detent or roller, 32, adapted to bind against the shaft or clutch ring, 33, rigidly mounted thereon, when the clutch member is pushed forward and thereby turns the shaft, but adapted to loosen when moved to the larger portion of the pocket during the movement of the member in the opposite direction, and slip backward over the clutch ring. The spring plungers, 34, normally tend to push the rollers, 32, toward the narrow portion of the pockets, but the rollers are provided at their ends with trunnions mounted in the annular rings, 35, which are rotatably mounted on the member, 30, and provided with an arm, 36, adapted to engage the stop, 37, when the piston is returned to its extreme inner position and thereby force the rollers back against the spring plungers, 34, to their loose position in the pockets. The rings, 35, may be secured and guided upon the member, 30, by means of stud bolts, 38, extending through slots, 39. With this construction, the reciprocating movement of the piston and rod operates to alternately lock and release the clutch device in its forward and backward movements, and thereby turns the axle, as is well understood, the extreme release movement of the piston bringing the arm 36 into engagement with the stop 37 to withdraw the locking means.

In the modification shown in Figs. 9 to 12, the construction is similar to that of Figs. 1, except that, instead of the cylinder, 5, being rigidly mounted on the frame, it is mounted to oscillate on the trunnions, 41, and the end of the piston rod, 7, is pivotally connected to the upper ends of the rocker arms, 42, journalled to oscillate on the axle, or on the hub of the ratchet wheel, 22, rigidly fastened to the axle. The pawl, 17, is pivotally mounted on the piston rod and engages the teeth of the ratchet wheel, 22, to operate the axle in a manner similar to that described in connection with Fig. 1.

Where the cylinder, 5, is mounted to oscillate on trunnions, the supply pipe, 26, will, of course, be provided with a flexible connection to allow for this movement.

In the construction of the motor, the inlet port, 10, is located at some distance from the cylinder head so that during the normal operation of the motor, the piston will not return at each stroke to its extreme inner position, since the arm, 15, is adapted to actuate the valve through spring, 14$^a$, and tappet, 14, to open the inlet port when the piston has returned nearly to port, 10, and before the releasing stop, 23, or 37, has been reached. The piston, therefore, again moves outward and continues to reciprocate in this manner until the fluid supply to pipe, 26, is cut off. Then the spring, 8, will operate to return the piston to its extreme inner position against the cylinder head, during which movement the arm, 15, compresses the spring, 14$^a$, on the valve stem, and the stop releases the locking pawl, detents, or rollers, from engagement.

Having now described my invention, what I claim as new and desire to secure by Letters Patent is:

1. In a vehicle, the combination of a cylinder, a piston therein, a piston rod extending through the head of the cylinder and supported therein, a spring for opposing the outward movement of the piston, a forward locking and backward slipping device mounted to oscillate upon an axle of the vehicle and connected to said piston rod, and means operated by the extreme release movement of the piston for withdrawing the locking means.

2. In a vehicle, the combination of a cylinder, a piston therein, a piston rod extending through the head of the cylinder and supported therein, a spring for opposing the outward movement of the piston, a forward locking and backward slipping device mounted to oscillate upon an axle of the vehicle and connected to said piston rod, and a stop carried by the cylinder for withdrawing the locking means when the piston moves to its extreme release position.

3. In a vehicle, the combination with a frame, a motor mounted thereon and comprising a cylinder, piston, and rod, and a forward locking and backward slipping device mounted on an axle and operated by said rod, of a tie bar on the axle, for relieving the frame from the thrust of the motor.

4. In a vehicle, the combination with a frame, a motor mounted thereon and comprising a cylinder, piston and rod, and a forward locking and backward slipping device mounted on an axle and operated by said rod, of a tie bar having a bearing around the axle and pivotally connected with said frame.

5. In a vehicle, the combination with a motor comprising a cylinder, piston and rod, of an oscillating friction clutch member rotatably mounted on an axle and having tapered recesses, detents mounted in said recesses, a ring for shifting said detents to release position, a stop for actuating said ring, and an operative connection between the rod and said member.

6. In a vehicle, the combination with a motor comprising a cylinder, piston and rod, of an oscillating friction clutch member rotatably mounted on an axle and having tapered recesses, friction rollers mounted in said recesses, springs acting on said rollers, and an operative connection between the rod and said member.

7. In a vehicle, the combination with a motor comprising a cylinder, piston and rod, of an oscillating friction clutch member rotatably mounted on an axle and having tapered recesses, friction rollers mounted in said recesses, springs acting on said rollers, rings rotatably mounted on said member and attached to said rollers, and a stop for actuating said rings.

8. In a vehicle, the combination of a cylinder, a piston, a forward locking and backward slipping device mounted on an axle of the vehicle and actuated by said piston, and an oscillating arm attached to said forward locking and backward slipping device and having a lost motion connection with said piston.

9. In a vehicle, the combination of a cylinder mounted on the vehicle frame, a piston in said cylinder, a forward locking and backward slipping device mounted on an axle of the vehicle and actuated by said piston and a tie-bar attached to said frame and to said axle and adapted to take the thrust of said piston.

In testimony whereof I have hereunto set my hand.

CLEMENT F. STREET.